Aug. 10, 1965     U. S. MANGUM     3,199,623

FRONT WHEEL DRIVE FOR MOTORCYCLE

Filed Sept. 9, 1963

*INVENTOR.*
UVAS S. MANGUM
BY Robert R. Finely
ATTORNEY 3,199,623
FRONT WHEEL DRIVE FOR MOTORCYCLE
Uvas S. Mangum, 830 East 6600 South, Midvale, Utah
Filed Sept. 9, 1963, Ser. No. 307,689
1 Claim. (Cl. 180—31)

This invention relates generally to motor bikes or scooters having a single steerable front wheel; and in particular to vehicles of this general type having arrangements for simultaneously driving both front and rear wheels and for steering by turning only the single front wheel.

It is the primary object of this invention to provide a motor bike that is simple of construction yet has means for simultaneously driving both front and rear wheels at the same speed by utilization of a simple system of flexible draft means, guide rolls and driving sprockets.

An important related object is the provision of a motor bike construction attaining the foregoing object and additionally enabling unhindered steering of the front wheel without loss of efficiency in the power train.

Briefly, the invention comprises a wheeled vehicle steered by a single front wheel in usual fashion, motor means, a first power train transmitting power to the rear wheel or wheels, a second power train transmitting power to the steerable front wheel at the same ratio as transmitted to the rear, and flexible draft means and guide pulleys in said second power train for carrying power to the front wheel directly through the steering mechanism.

In order that the invention may be more readily understood and carried into effect, reference is made to the accompanying drawings and the description thereof which are offered by way of example only and are not to be taken in limitation of the invention, the scope of which is defined by the appended claim rather than the description preceding such claim.

Figure 3:
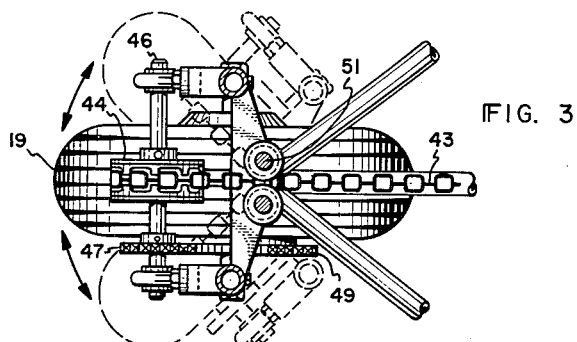
FIG. 3 is a view of the front steering assembly and frame of the scooter taken in the plane of line 3—3 of FIG. 1 and looking in the direction of arrows 3.
Figure 2:
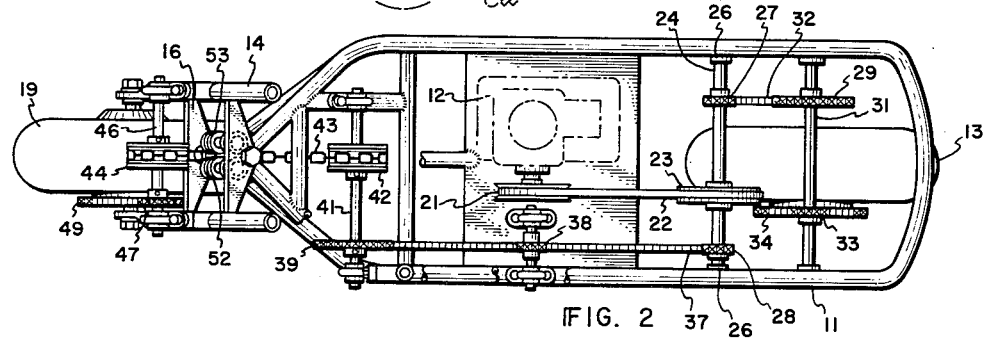
FIG. 2 is a top view of the scooter of FIG. 1, the view being taken as looking in the direction of arrows 2 of FIG. 1.
Figure 1:
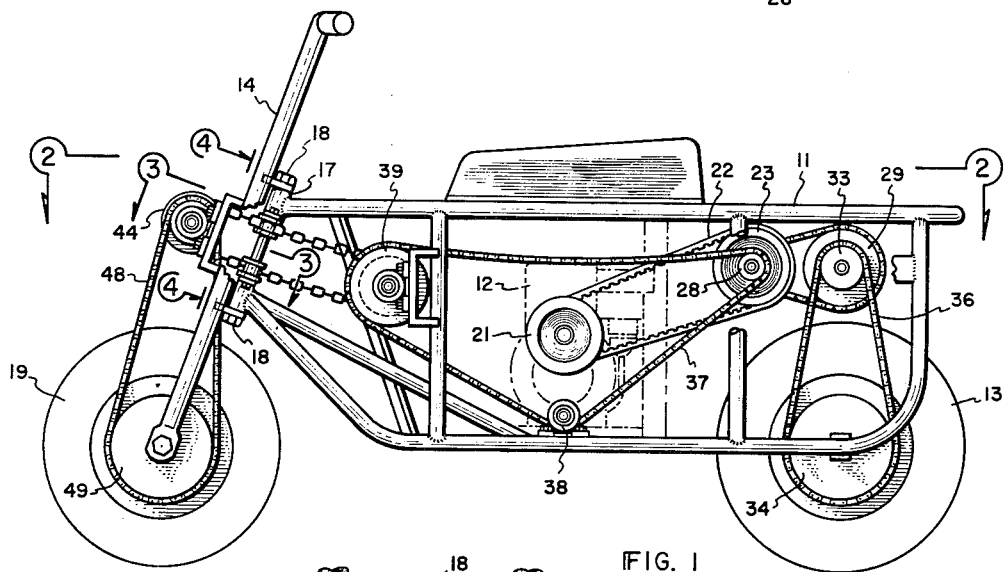
FIG. 1 is a side elevational view of a two-wheeled motor-scooter embodying the invention, certain elements being shown in phantom lines for purposes of clarity.
Figure 4:
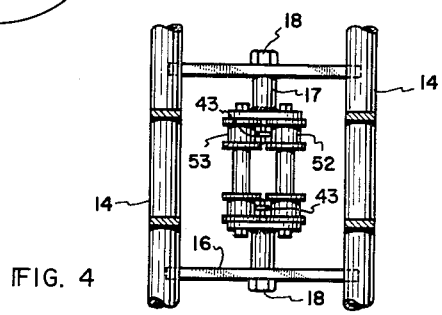
FIG. 4 is a partial front view of the steering and power transmission assembly and is taken in the plane indicated by arrows 4 in FIG. 1.

The scooter is constructed with a main frame 11 of any suitable design and carries a small motor 12 mounted thereon in usual fashion. A rear wheel 13 is rotatably mounted adjacent the rear of the frame and power is transmitted thereto through a power train to be hereinafter described in greater detail.

A steerable front wheel assembly is mounted at the forward end of the frame and comprises a generally vertical double post frame 14 which, as formed, is open in the center thereby providing a passageway transversely through its longitudinal center line. The frame is provided with spaced-apart transverse reinforcing members 16 which also serve as brackets forming part of the bearing means by which the front frame assembly is journalled for rotation with respect to the main frame for steering. Such bearing means includes, in addition to the transverse members 16 on the vertical frame, a pair of vertically spaced cylindrical members 17 on the front of the main frame. These are adapted to receive shafts or pins 18 which pass through each bracket thence through one of the cylindrical members 17 to complete the assembly. Thus, the entire front frame is rotatable about the axes of the pins 18 to effect steering of the scooter in known manner. In other words, the axes of pins 18 define an axis about which the steering mechanism rotates and which is transverse to the longitudinal axis of the main frame of the scooter.

A front wheel 19 is suitably journalled between the two posts of the front frame.

Traction power is supplied to both wheels from the single engine 12. The fly wheel 21 of the engine is connected by means of a suitable belt or other draft means 22 to a pulley or sprocket 23 fixedly mounted on a rear transverse jack shaft 24 journalled in bearings 26 on opposite side of the main frame.

Additional sprockets 27 and 28 are fixedly mounted on the shaft to rotate therewith as it is driven.

One of the sprockets 27 drives the rear wheel through a power train which includes a sprocket 29 fixedly mounted on a second shaft 31 and a chain 32 interconnecting sprockets 27 and 29; an additional sprocket 33 is also fixed on shaft 31 and this in turn is connected by chain 36 to a sprocket 34 secured to and rotatable with the rear wheel.

The front wheel is driven from the fly wheel 21 by a power train comprising the sprocket 28 on the jack shaft 24, a chain 37 trained successively about the sprocket 28, an idler pulley 38 and a front sprocket 39 fixedly mounted on a front transverse jack shaft 41 adjacent the front of the main frame; a further sprocket 42 is fixed on the shaft 41, and a chain 43 is trained about this sprocket 42 and another sprocket 44 mounted on a transverse idler shaft 46 rotatably mounted on the forward side of the front steering assembly frame.

The front shaft 44 is provided with an output sprocket 47 which serves to drive, by chain 48, a driving sprocket 49 attached to the front wheel.

It is important that the sizes of the sprockets be so selected and coordinated that the same final rotational speed is imparted to both front and rear wheels.

The important features of the front drive mechanism to be found in the positioning and functional connections between the shaft 41 located on the main frame back of the steering frame; and the front shaft 46 journalled on the forward side of the front or steering frame.

According to the invention, the chain 43 is enabled to transmit power despite rotation of the front frame about the axis of pins 18. This is accomplished by means of an idler-pulley guide assembly, generally designated 51 on the front of the main frame. This assembly includes pairs of spaced-apart idler pulleys 52 and 53 mounted on the main frame between the cylindrical bearing members 17 and located with their axes in the same plane as the pins 18. In other words, and this is important, the transverse common axis of the pins 18 should pass directly between and in the same plane as the axes of the idler pulleys 52 and 53; and the plane, between opposite sides of the main frame, in which the transverse axis and the guide pulleys lie is transverse at right angles to the longitudinal axis of the main frame. When the parts are so positioned with respect to each other there is provided a passageway defined between the guide pulleys and the cylindrical bearing means through which the chain 43 passes and in which is located the central axis about which the front frame pivots. Since the guide pulleys are located on opposite sides of and in the same transverse plane as the axes of pins 18. They serve to confine the chain 43 against lateral movement to either side of the axis of pins 18 thereby insuring that the chain must always pass through the passageway and axis despite rotation of the steering frame. In other words, the path of the chain 43 between front sprocket 44 on the steering frame and sprocket 42 on the main frame always passes through the common axis of pins 18. Inasmuch as the axis is the pivot point about which the steering frame is rotated, it follows that the path of chain 43 is of fixed length. Hence, tension on the chain remains constant in all attitudes of the steering frame.

In connection with the guide pulleys, it is to be noted that they are provided in pairs to accommodate simultaneously the forward and return movements of the upper and lower flights of the chain.

It will be noted that the entire arrangement as described is very simple and that the method of transmitting power from the steering frame to the front wheels despite rotation of the front frame is very important. By positioning the idler guide rollers as described there is insured constant drive of the front wheels without change in speed in all steering attitudes.

Insofar as the transmission of power generally from the engine to the wheels is concerned, it may follow any accepted form and still be within the spirit of the invention so long as the power transmission through the steering frame assembly to the front wheel employs the arrangement described which, as noted, includes briefly a flexible draft means passing from the main frame to a sprocket on the steerable posts and during such passage is guided through the axis about which the posts pivot for steering and is laterally restrained and guided by idler pulleys or solid guides lying in a single transverse plane with such axis.

Attention is directed to the link chain employed for transmission of power through the steering frame. This is of great value because of its simplicity and ease of replacement in the field. However, any other endless flexible draft means in connection with suitable sprockets, sheaves or pulleys may be employed. It should be noted that in the claim the use of terms describing belts and pulleys is intended to include sprockets and chains and other equivalent structures.

I claim:

A front wheel driven motor scooter comprising a main frame having a rear wheel; a motor mounted on said frame; an elongated front frame having a front wheel at its lower end and a passageway through at least a portion of its longitudinal centerline; bearing means on said main frame and said front frame mounting said front frame to the front of said main frame for steering movement by rotation of said front frame about a substantially vertical steering axis; spaced apart guide means on the forward end of said main frame adjacent said passageway of said front frame, said guide means being located on opposite sides of and in substantially the same transverse plane with said steering axis and vertically displaced from said bearing means; a horizontal shaft and rotatable pulley fixedly mounted on said front frame forward of said steering axis; means operatively connecting said pulley to said front wheel; and power transmission means comprising an endless belt driven by said motor on said main frame and trained about said pulley on said front frame and extending therefrom to said main frame through said passageway of said front frame and through said steering axis between said guides of said main frame whereby upon rotation of said front frame said endless belt is laterally restrained by said guide means.

References Cited by the Examiner

UNITED STATES PATENTS

| | | | |
|---|---|---|---|
| 601,122 | 3/98 | Caswell | 74—240 |
| 1,279,556 | 9/18 | Kulma | 180—26 |
| 3,045,772 | 7/62 | Nicolai | 180—31 |
| 3,103,188 | 9/63 | Rice | 74—240 |
| 3,118,514 | 1/64 | Bowman | 180—31 |

PHILIP ARNOLD, *Primary Examiner.*

KENNETH H. BETTS, A. HARRY LEVY, *Examiners.*